(12) United States Patent
Hasz et al.

(10) Patent No.: US 6,846,575 B2
(45) Date of Patent: Jan. 25, 2005

(54) ARTICLE HAVING TURBULATION AND METHOD OF PROVIDING TURBULATION ON AN ARTICLE

(75) Inventors: Wayne Charles Hasz, Pownal, VT (US); Robert Alan Johnson, Simpsonville, SC (US); Ching-Pang Lee, Cincinnati, OH (US); Mark Gerard Rettig, Cincinnati, OH (US); Nesim Abuaf, Lincoln City, OR (US); John Howard Starkweather, Cincinnati, OH (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 10/455,033

(22) Filed: Jun. 5, 2003

(65) Prior Publication Data

US 2004/0131877 A1 Jul. 8, 2004

Related U.S. Application Data

(62) Division of application No. 10/176,782, filed on Jun. 24, 2002, now Pat. No. 6,598,781, which is a division of application No. 09/304,276, filed on May 3, 1999, now Pat. No. 6,468,669.

(51) Int. Cl.⁷ .............................................. B23K 35/22

(52) U.S. Cl. .................. 428/606; 428/546; 228/56.3; 420/443; 420/445; 420/437; 420/40

(58) Field of Search .................. 428/600, 558, 428/687, 559, 621, 627, 553, 679, 678, 680, 606, 546; 165/133; 416/241 R; 228/248.1, 248.5, 245, 178, 56.3; 29/889.1, 889.7, 889.71, 889.61, 890.054, 888; 427/383.7; 420/445, 455, 437, 40, 443

(56) References Cited

U.S. PATENT DOCUMENTS

| | | | | |
|---|---|---|---|---|
| 3,293,692 A | * | 12/1966 | Rosenbaum | 425/79 |
| 3,666,006 A | | 5/1972 | Valyi | |
| 3,876,447 A | * | 4/1975 | Lally | 228/122.1 |
| 4,003,716 A | | 1/1977 | Steigelman | |
| 4,029,476 A | * | 6/1977 | Knopp | 428/676 |
| 4,064,914 A | | 12/1977 | Grant | |
| 4,101,691 A | | 7/1978 | Borchert | |
| 4,116,723 A | | 9/1978 | Gell et al. | |
| 4,154,293 A | | 5/1979 | Fenner et al. | |

(List continued on next page.)

FOREIGN PATENT DOCUMENTS

| | | | |
|---|---|---|---|
| EP | 0686457 | * | 12/1995 |
| JP | 61-3805 | * | 1/1986 |
| JP | 3-32493 | * | 2/1991 |
| WO | 990677 | | 2/1999 |

OTHER PUBLICATIONS

Pastes, Transfer Tapes, Preforms:, Prexair product brochure (3 pages) (no–date).

"Drills & Cutters", prints from website ww.dremel.com, 3/99 (2 pages).

Effects of Turbulator Profile and Spacing on Heat Transfer and Friction in a Channe: by M.E. Taslim and S.D. Spring, Journal of Thermophysics and Heat Transfer, vol. 8, No. 3, Jul.–Sep. 1994, pp. 555–562.

Primary Examiner—John J. Zimmerman
(74) Attorney, Agent, or Firm—Paul J. DiConza; Patrick K. Patnode (57) ABSTRACT

An article includes turbulation material bonded to a surface of a substrate via a bonding agent, such as a braze alloy. In an embodiment, the turbulation material includes a particulate phase of discrete metal alloy particles having an average particle size within a range of about 125 microns to about 4000 microns. Other embodiments include methods for applying turbulation and articles for forming turbulation.

10 Claims, 1 Drawing Sheet

U.S. PATENT DOCUMENTS

| | | | |
|---|---|---|---|
| 4,154,294 A | | 5/1979 | Notaro |
| 4,228,214 A | * | 10/1980 | Steigelman et al. ........ 428/212 |
| 4,268,564 A | * | 5/1981 | Narasimhan ................. 51/309 |
| 4,689,242 A | | 8/1987 | Pike |
| 4,726,101 A | * | 2/1988 | Draghi et al. .............. 29/889.1 |
| 4,744,725 A | | 5/1988 | Matarese et al. |
| 4,749,594 A | | 6/1988 | Malikowski et al. |
| 4,938,991 A | | 7/1990 | Bird |
| 5,106,010 A | | 4/1992 | Stueber et al. |
| 5,196,232 A | | 3/1993 | Kitazaki et al. |
| 5,310,520 A | * | 5/1994 | Jha et al. ...................... 419/48 |
| 5,319,179 A | | 6/1994 | Joecks et al. |
| 5,352,526 A | * | 10/1994 | Solanki et al. ............. 428/422 |
| 5,353,865 A | | 10/1994 | Adiutori et al. |
| 5,359,770 A | * | 11/1994 | Brown et al. .............. 29/889.1 |
| 5,361,828 A | | 11/1994 | Lee et al. |
| 5,374,319 A | | 12/1994 | Stueber et al. |
| 5,399,313 A | | 3/1995 | Ross et al. |
| 5,523,169 A | * | 6/1996 | Rafferty et al. ............. 428/551 |
| 5,549,927 A | | 8/1996 | Cottone et al. |
| 5,666,643 A | * | 9/1997 | Chesnes et al. ............. 428/549 |
| 5,902,421 A | * | 5/1999 | Christy ....................... 148/528 |
| 5,975,850 A | | 11/1999 | Abuaf et al. |
| 6,142,734 A | | 11/2000 | Lee |
| 6,210,812 B1 | * | 4/2001 | Hasz et al. ................. 428/621 |

* cited by examiner fig. 1 fig. 2 fig. 3

ARTICLE HAVING TURBULATION AND METHOD OF PROVIDING TURBULATION ON AN ARTICLE

RELATED APPLICATIONS

This application is a division of application Ser. No. 10/176,782, filed Jun. 24, 2002, now U.S. Pat. No. 6,598,781, which is hereby incorporated by reference in its entirety, and which is a division of application of application Ser. No. 09/304,276, filed May 3, 1999, now U.S. Pat. No. 6,468,669.

BACKGROUND OF THE INVENTION

Various techniques have been devised to maintain the temperature of turbine engine components below critical levels. As an example, coolant air from the engine compressor is often directed through the component, along one or more component surfaces. Such flow is understood in the art as "backside air flow," where coolant air is directed at a surface of an engine component that is not directly exposed to high temperature gases from combustion. In combination with backside air flow, "turbulators" have been used to enhance heat transfer. Turbulators are protuberances or "bumps" on selected sections of the surface of the component, which function to increase the heat transfer with the use of a coolant medium that is passed along the surface.

Turbulators are generally formed by casting. However, casting cannot readily be used to apply turbulation to certain areas of a component. For example, it is very difficult to cast protuberances on some portions of the turbine engine parts, such as on certain sections of internal cavities; in locations where there is restricted molten metal flow; or in areas where mold sections are separated during fabrication. It may also be difficult to provide turbulation to some of the external surfaces of turbine parts, such as the outer platforms of an engine nozzle.

In some instances, the turbulation on the surfaces of engine components has to be repaired or modified while the engine is in service. In other instances, it may be necessary to add turbulation to engine components during service or repair, to improve the heat transfer and cooling effectiveness at specific locations within the component. The addition and repair of turbulation cannot be achieved by the casting process.

One known technique of applying turbulation to an already formed component, is to wire-spray turbulation onto a surface of the substrate. A deficiency associated with such type of turbulation is oxidation of the coating, which reduces heat transfer effectiveness. In cased of severe oxidation, coating spallation may result with subsequent complete loss of heat transfer benefits.

Further methods for applying turbulation to various types of metal substrates would be welcome in the art. There is a need for methods that are capable of providing turbulation on surfaces that lie within cavities, and on any other surface that is not easily accessible. There is a need for methods that are capable of applying protuberances of different sizes and shapes, and in patterns. In addition, there is a need for articles having turbulation provided thereon having desirable heat transfer characteristics and durability.

SUMMARY OF THE INVENTION

One embodiment of the present invention calls for a method of providing turbulation on a surface of a substrate, including the steps of applying a layer on a surface of the substrate, the layer comprising braze alloy and turbulation material; and fusing the layer on the surface of the substrate, whereby the braze alloy bonds the turbulation material to the superalloy substrate. The layer of material may be applied to the substrate in various forms, including a brazing sheet and a slurry. In addition, the substrate may be a metal substrate, such as a superalloy substrate. Another embodiment of the invention calls for an article including a substrate and turbulation material bonded to a surface of the superalloy substrate by braze alloy. Still another embodiment calls for an article including a substrate to which is bonded turbulation material having a particular particle size. Other embodiments include a brazing sheet and a slurry including turbulation material.

DETAILED DESCRIPTION OF THE INVENTION

The present invention can be used with any metallic material or alloy, but is usually used with heat-resistant alloys designed for high-temperature environments, such as above 1000° C. As defined herein, "metal-based" refers to substrates that are primarily formed of metal or metal alloys. Some heat-resistant alloys are "superalloys" including cobalt-based, nickel-based, and iron-based alloys. In one embodiment, the superalloy is nickel or cobalt based, wherein nickel or cobalt is the single greatest element by weight. Illustrative nickel-based include at least about 40 wt % Ni, and at least one component from the group consisting of cobalt, chromium, aluminum, tungsten, molybdenum, titanium, and iron. Examples of nickel-based superalloys are designated by the trade names Inconel®, Nimonic®, Rene® (e.g., Rene®80-, Rene®95 alloys, Rene® 142 and Rene® N5), and Udimet®, and include directionally solidified and single crystal superalloys. Illustrative cobalt-based include at least about 30 wt % Co, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®.

While the type of substrate can vary widely, it is often in the form of a turbine engine part formed of a superalloy, such as a combustor liner, combustor dome, bucket or blade, nozzle or vane. Other substrates are turbine parts that are not in the high-pressure stage of the turbine engine, such as in shroud clearance control areas, including flanges, casings, and rings. Such parts may not be formed of a superalloy in view of lower temperature environments to which such components are exposed. Typical alloys for such components include Inconel® 718, Inconel® 900 series, and Waspaloy®.

According to embodiments of the present invention, a layer of material containing at least a braze alloy component and a turbulation material is utilized to provide turbulation on a surface of a substrate, particularly on a superalloy substrate. As used herein, the term "layer" of material is used to denote a single layer or several discrete sub-layers that are sandwiched together. A "layer" of material may have several phases, including a matrix phase having a discrete phase dispersed therein, and several phases defined by sub-layers. The layer of material may be in the form of a free-standing sheet, such as in the case of a brazing sheet, as well as a slurry containing at least the turbulation material and the braze alloy component. As used herein, "turbulation material" is a material that, upon fusing to a substrate, forms a plurality of protuberances that extend beyond the surface of the substrate. These plurality of protuberances together define "turbulation," which appears as a roughened surface that is effective to increase heat transfer through the treated substrate. According to several embodiments of the present invention, the turbulation material comprises a particulate phase comprised of discrete particles bonded to the substrate. The particulate phase of discrete particles may be formed from a coarse powder, described in more detail below with respect to embodiments herein.

In one embodiment of the invention, the layer of material is a brazing sheet, particularly a green braze tape. Such tapes are commercially available. In an embodiment, the green braze tape is formed from a slurry of metal powder and binder in a liquid medium such as water or an organic liquid. The liquid medium may function as a solvent for the binder. The metal powder is often referred to as the "braze alloy".

The composition of the braze alloy is preferably similar to that of the substrate. For example, if the substrate is a nickel-based superalloy, the braze alloy can contain a similar nickel-based superalloy composition. In the alternative, nickel-based braze alloys or cobalt-based braze alloys are usually used with cobalt-based superalloys. Nickel- or cobalt-based compositions generally denote compositions wherein nickel or cobalt is the single greatest element in the composition. The braze alloy composition may also contain silicon, boron, phosphorous or combinations thereof, which serve as melting point suppressants. It is noted that other types of braze alloys can be used, such as precious metal compositions containing silver, gold, or palladium, mixtures thereof, in combination with other metals, such as copper, manganese, nickel, chrome, silicon, and boron. Mixtures that include at least one of the braze alloy elements are also possible. Exemplary braze alloys include by weight percent, 2.9 boron, 92.6 nickel, 4.5 tin; 3.0 boron, 7.0 chromium, 3.0 iron, 83.0 nickel, and 4.0 silicon; 19.0 chromium, 71.0 nickel, and 10.0 silicon; 1.8 boron, 94.7 nickel, and 3.5 silicon.

A variety of materials are generally used as binders in the slurry for forming the green braze tape. Non-limiting examples include water-based organic materials, such as polyethylene oxide and various acrylics. Solvent-based binders can also be used. Additional organic solvent (e.g., acetone, toluene, or various xylenes) or water may be added to the slurry to adjust viscosity.

The slurry is usually tape cast onto a removable support sheet, such as a plastic sheet formed of a material such as Mylar®. A doctor-blade apparatus can be used for tape-casting. Substantially all of the volatile material in the slurry is then allowed to evaporate. The resulting braze alloy tape usually has a thickness in the range of about 1 micron to about 250 microns, and preferably, in the range of about 25 microns to about 125 microns.

Braze tapes containing the above-mentioned braze alloy and binder are commercially available. An example of a commercial product is the Amdry line of braze tapes, available from Sulzer Metco. An exemplary grade is Amdry®100.

The turbulation material that is applied to the green braze tape is typically a coarse powder, being formed of particles having a size sufficient to form protuberances that function to increase heat transfer of the treated component. In many embodiments, the size of the particles is determined in large part by the desired degree of surface roughness and surface area (and consequently, heat transfer) that will be provided by the protuberances. Surface roughness is characterized herein by the centerline average roughness value "Ra", as well as the average peak-to-valley distance "Rz" in a designated area as measured by optical profilometry. According to an embodiment, Ra is greater than about 0.1 mils, such as greater than about 1.0 mils, and preferably greater than about 2.0 mils. Ra is typically less than about 25 mils, more typically less than about 10 mils. Similarly, according to an embodiment, Rz is greater than about 1 mil, such as greater than about 5 mils. Rz is typically less than about 100 mils, more typically less than about 50 mils. As used herein, the term "particles" may include fibers, which have a high aspect ratio, such as greater than. 1:1. In one embodiment, the average size of the turbulation powder particles is in the range of about 125 to about 4000 microns, such as about 150 to about 2050 microns. In a preferred embodiment, the average size of the powder particles is in the range of about 180 microns to about 600 microns.

The turbulation material is often formed of a material similar to that of the substrate metal, which is in turn similar to that of the braze alloy. The turbulation powder, however, may have a higher melting point or softening point than that of the braze alloy such that the turbulation powder remains largely intact through the fusing operation. Usually, the turbulation powder comprises at least one element selected from the group consisting of nickel, cobalt, aluminum, chromium, silicon, iron, and copper. The powder can be formed of a superalloy bond coat composition for thermal barrier coating (TBC) systems, such as a superalloy composition of the formula MCrAlY, where "M" can be various metals or combinations of metals, such as Fe, Ni, or Co. The MCrAlY materials generally have a composition range of about 17.0–23.0% chromium; about 4.5–12.5% aluminum; and about 0.1–1.2% yttrium; with M constituting the balance.

However, it should be emphasized that an important advantage of the present process relates to the ability to change the surface "chemistry" of selected portions of the substrate by changing the composition of the turbulation material. For example, the use of oxidation-resistant or corrosion-resistant metal alloys for the turbulation material will result in a turbulated surface that exhibits those desirable properties. As another illustration, the thermal conductivity of the turbulation material, which affects the heat transfer, can be increased by using a material with a high thermal conductivity, such as nickel aluminide which has a thermal conductivity on the order of 228 Btu·in/ft$^2$·hF. In one embodiment the turbulation powder is formed of a material having a thermal conductivity greater than about 60 Btu·in/ft$^2$·hF, preferably greater than about 80 Btu·in/ft$^2$·hF, such as greater than about 130 Btu·in/ft$^2$·hF. In contrast, prior art casting techniques for producing turbulation usually employ only the base metal material for the protuberances, thereby limiting flexibility in selecting the characteristics of the turbulated surface.

The powder can be randomly applied by a variety of techniques, such as sprinkling, pouring, blowing, roll-depositing, and the like. The choice of deposition technique will depend in part on the desired arrangement of powder particles, to provide the desired pattern of protuberances. As an example, metered portions of the powder might be sprinkled onto the tape surface through a sieve in those instances where the desired pattern-density of the protuberances is relatively low.

Usually, an adhesive is applied to the surface of the green braze tape prior to the application of the turbulation powder thereon. Any braze adhesive can be used, so long as it is capable of completely volatilizing during the subsequent fusing step. Illustrative examples of adhesives include polyethylene oxide and acrylic materials. Commercial examples of braze adhesives include "4B Braze Binder", available from Cotronics Corporation. The adhesive can be applied by various techniques. For example, liquid-like adhesives can be sprayed or coated onto the surface. A thin mat or film with double-sided adhesion could alternatively be used, such as 3M Company's 467 Adhesive Tape.

In one embodiment, prior to being brazed, the powder particles are shifted on the tape surface to provide the desired alignment that would be most suitable for heat transfer. For example, acicular particles, including fibers, having an elongated shape may be physically aligned so that their longest dimension extends substantially perpendicular to the surface of the brazing sheet contacting the substrate. The alignment of the powder may be carried out by various other techniques as well. For example, a magnetic or electrostatic source may be used to achieve the desired orientation. In yet another embodiment, individual particles or clusters of particles are coated with braze alloy, and such coated particles are placed on an adhesive sheet for application to a substrate. The adhesive sheet can be formed of any suitable adhesive, provided that it is substantially completely burned-out during the fusing operation. Suitable adhesives are discussed above.

In some embodiments, the turbulation powder is patterned on the surface of the braze sheet. Various techniques exist for patterning. In one embodiment, the powder is be applied to the substrate surface through a screen, by a screen printing technique. The screen would have apertures of a pre-selected size and arrangement, depending on the desired shape and size of the protuberances. Alternatively, the braze adhesive is applied through the screen and onto the sheet. Removal of the screen results in a patterned adhesive layer. When the powder is applied to the sheet, it will adhere to the areas that contain the adhesive. By use of a screen, a pattern may be defined having a plurality of "clusters" of particles, wherein the clusters are generally spaced apart from each other by a pitch corresponding to the spacing of the openings in the screen. The excess powder can easily be removed, leaving the desired pattern of particles. As another alternative, a "cookie cutter" technique may be employed, wherein the braze tape is first cut to define a desired turbulation pattern, followed by removal of the excess braze tape. The turbulation powder can then be applied to the patterned tape. In yet another embodiment, particles of the turbulation material are coated with braze alloy, and the coated particles are adhered onto an adhesive sheet that volatilizes during the fusing step. Here, the adhesive sheet provides a simple means for attachment of the turbulation material to the substrate prior to fusing, but generally plays no role in the final, fused article.

In another embodiment, the turbulation powder is mixed with the other components of the green braze tape, such as braze alloy powder, binder and solvent, during formation of the green braze tape, rather than providing the turbulation powder on a surface of the already formed tape. The turbulation powder in turn forms a dispersed particulate phase within the green braze tape.

The removable support sheet, such as Mylar® backing is then detached from the green braze tape. The tape is then attached to a portion of the component-substrate where turbulation is desired. As an example, an adhesive may be employed. Any adhesive suitable for attaching the tape to the substrate material would be suitable, provided that it completely volatilizes during the fusing step.

Another simple means of attachment is used in some embodiments. The green braze tape can be placed on a selected portion of the substrate, and then contacted with a solvent that partially dissolves and plasticizes the binder, causing the tape to conform and adhere to the substrate surface. As an example, toluene, acetone or another organic solvent could be sprayed or brushed onto the braze tape after the tape is placed on the substrate.

Following application of the green braze tape to the substrate, the turbulation material is fused to the substrate. The fusing step can be carried out by various techniques, such as brazing and welding. Generally, fusing is carried out by brazing, which includes any method of joining metals that involves the use of a filler metal or alloy. Thus, it should also be clear that braze tapes and braze foils can be used in fusing processes other than "brazing". Brazing temperatures depend in part on the type of braze alloy used, and are typically in the range of about 525° C. to about 1650° C. In the case of nickel-based braze alloys, braze temperatures are usually in the range of about 800° C. to about 1260° C.

When possible, brazing is often carried out in a vacuum furnace. The amount of vacuum will depend in part on the composition of the braze alloy. Usually, the vacuum will be in the range of about $10^{-1}$ torr to about $10^{-8}$ torr, achieved by evacuating ambient air from a vacuum chamber to the desired level.

In the case of turbulation being applied to an area which does not lend itself to the use of a furnace, such as when the component itself is too large to be inserted into a furnace, a torch or other localized heating means can be used. For example, a torch with an argon cover shield or flux could be directed at the brazing surface. Specific, illustrative types of heating techniques for this purpose include the use of gas welding torches (e.g., oxy-acetylene, oxy-hydrogen, air-acetylene, air-hydrogen); RF (radio frequency) welding; TIG (tungsten inert-gas) welding; electron-beam welding; resistance welding; and the use of IR (infra-red) lamps.

The fusing step fuses the brazing sheet to the substrate. When the braze material cools, it forms a metallurgical bond at the surface of the substrate, with the turbulation material mechanically retained within the solidified braze matrix material.

In another embodiment of the invention, the layer of material is a brazing sheet in the form of a metal foil having first and second surfaces. The foil is formed of a metallic material similar to that of the substrate, such as a braze alloy like that described for the previous embodiment. Thus, if the substrate is a nickel-based superalloy, the foil material may be a nickel-based superalloy. The braze alloy composition for foils, which does not contain a binder as in the case of braze tapes, may contain silicon, boron, or combinations thereof, which serve as melting point suppressants. Other braze alloy compositions may also be suitable, such as those comprising cobalt or iron; or the precious metal compositions described previously. The foil usually has a thickness of about 0.1 micron to about 2500 microns, and preferably, about 25 microns to about 200 microns.

Various techniques can be used to make such a foil. In the first technique, a mixture of metallic powder material and binder is tape-cast onto a removable support sheet. The support sheet is removed, and the remaining green sheet is then sintered into a "pre-form" foil, e.g., by using a vacuum heat treatment. The sintering temperature is dependent on various factors, such as the composition of the foil-alloy, the size of the powder particles, and the desired density of the foil. This process is typically called a "tape-cast pre-form" technique.

According to a second alternative technique, a metallic powder material is deposited onto a support sheet as a thin layer of metal. Various thermal spray techniques are usually used for the deposition, such as vacuum plasma deposition, HVOF (high velocity oxy-fuel), or air plasma (AP) spray. Other deposition techniques could be employed as well, e.g., sputtering or physical vapor deposition (PVD). The support sheet is then removed, leaving the desired metal foil.

A third technique for making the foil is sometimes referred to as an amorphous metal ribbon technique. In this process, the metallic powder material is melted, and the molten material is poured onto a high-speed roller that very rapidly quenches the molten material. The quenched material is ejected from the roller as a ribbon. Braze foils, are commercially available from various sources, such as Wesgo and Allied Signal Company. In general, the braze foil differs from the green braze tape described above in that the foil is in a sintered, densified form before application of the turbulation powder and subsequent fusing to a substrate.

The turbulation powder is applied to the first surface of the braze foil. The powder generally has the same characteristics as the powder described for the previously described embodiment incorporating a green braze tape. As in that case, the powder is usually formed of a material similar to that of the substrate metal, which in turn is similar to that of the braze alloy. Thus, the powder is usually nickel-based, and may have a composition of the formula MCrAlY, as described previously. The techniques described above can be used to apply the powder, such as thermal spray or casting.

Usually, an adhesive is applied to the second surface of the foil, prior to the application of the turbulation powder. The adhesive can be selected from those described previously, provided that it adheres to the metallic foil and it completely volatilizes during the subsequent fusing step. Illustrative adhesives are those that were described previously, e.g., polyethylene oxide and various acrylics. Techniques for applying the adhesive would also be similar or identical to those described previously.

Moreover, the powder particles can be shifted and aligned as described above, based on the required heat transfer characteristics for the substrate surface. Similarly, the powder particles can also be patterned on the surface of the foil by various techniques.

In some instances, the substrate surface to which the foil will be attached is curved. In such a case, it may be desirable to provide the foil with an identical curvature. Relatively thin foils may be easily bent to match the curvature of a substrate. Foils of greater thickness usually are not flexible, but can be shaped by other techniques. As an example, a removable support sheet may be employed during fabrication, which sheet has the desired curvature of the substrate. The braze material can be deposited on the support sheet by the techniques described previously, e.g., thermal spraying or casting (for example, liquid metallic casting without a binder, or powder-slurry casting, with a binder). The turbulation powder can then be deposited on the foil, as also described previously. The turbulation-containing foil which has the desired curvature can then be detached from the support sheet. (Alternatively, the turbulation powder could be applied to the foil surface after the support sheet is removed).

The turbulated braze foil is cut to a size appropriate for the site on the substrate where turbulation is to be formed. The foil can then be attached to that portion of the substrate. As an example, the first surface of the foil, i.e., the surface opposite that which is coated with the turbulation powder, could be attached to the substrate with an adhesive sheet or adhesive composition. Any adhesive suitable for attaching the foil to the substrate metal should be suitable, as long as it completely volatilizes during the fusing step. Illustrative adhesives are those that were described previously.

Alternatively, the braze foil could be attached by mechanical means. In some preferred embodiments, the foil is locally welded to the substrate surface at a few locations (spot welding). A variety of heating techniques could be employed, such as TIG (tungsten inert-gas) welding, resistance welding, gas welding (e.g., with a torch); RF welding, electron-beam welding; and IR lamp methods.

Fusing of the foil to the substrate can then be undertaken as described previously, with brazing often being used for this step. Brazing temperatures will again depend in part on the type of braze alloy used for the foil, and are typically in the range of about 525° C. to about 1650° C. In the case of nickel-based braze alloys as described above, braze temperatures are usually in the range of about 800° C. to about 1260° C. The fusing step fuses the foil to the substrate, as described previously, and may be carried out in a vacuum furnace. Alternatively, brazing may be accomplished through use of a torch or other heating technique (e.g., the welding techniques mentioned above) can be used for fusing the foil to the substrate, as an alternative to the vacuum furnace.

According to another embodiment, the substrate is coated with a layer of material in slurry form. That is, in contrast to the embodiments described above, a brazing sheet (in the form of a green braze tape or brazing foil) is not used. Rather, a slurry containing a liquid medium, braze alloy powder, and turbulation powder is directly applied to a surface of the substrate. The slurry is dried, and then the coated substrate is heated such that the braze softens to form a film that bonds the turbulation powder to the substrate. The slurry may optionally contain a binder, and the liquid medium may function as a solvent for the binder. Use of a binder is desirable in cases where handling of the component is necessary after drying of the slurry and before fusing, such as transporting the coated component to a furnace.

The liquid medium may be water, an organic component such as acetone, toluene or various xylenes, or mixtures of water and an organic component. The turbulation powder, braze alloy powder, and binder may be formed of materials described above. For example, the turbulation powder generally includes at least one element selected from the group consisting of nickel, cobalt, iron, and copper. In one embodiment, the turbulation powder has a composition according to the formula MCrAlY, where "M" is a metal from the group Fe, Ni, or Co, or combinations thereof. MCrAlY materials may have a composition range of about 17.0–23.0% Cr, 4.5–12.5% Al, and about 0.1–1.2% Y, the balance M. In one embodiment, M is Ni. By way of example, binders include water-based organic materials (or combinations of materials), such as polyethylene oxide and various acrylics. Solvent-based binders can also be used.

The slurry itself generally contains turbulation powder, braze alloy, and binder. The amount of braze alloy is chosen relative to the turbulation powder in an amount sufficient to bond the particles of the turbulation powder to the substrate, such as about 1 to 40 wt % braze alloy and the balance (about 60 to 99 wt %) turbulation powder. The amount of binder is generally present in an amount to ensure sufficient green strength for handling while minimizing the volume of binder burnout, such as about 1 to 20 wt % of the slurry.

In the embodiments described above, the structure of the component after-fusing includes a solidified braze film that forms a portion of the outer surface of the component, and protuberances that extend beyond that surface. The protuberances are generally made up of a particulate phase comprised of discrete particles. The particles may be arranged in a monolayer, which generally has little or no stacking of particles, or alternatively, clusters of particles in which some particles may be stacked on each other. Thus, after fusing, the treated component has an outer surface defined by the film of braze alloy, which has a particulate phase embedded therein. The film of braze alloy may form a continuous matrix phase. As used herein, "continuous" matrix phase denotes an uninterrupted film along the treated region of the substrate, between particles or clusters of particles. Alternatively, the film of braze alloy may not be continuous, but rather, be only locally present to bond individual particles to the substrate. In this case, the film of braze alloy is present in the form of localized fillets, surrounding discrete particles or clusters of particles. In either case, thin portions of the film may extend so as to coat or partially coat particles of the turbulation powder.

Figure 1:
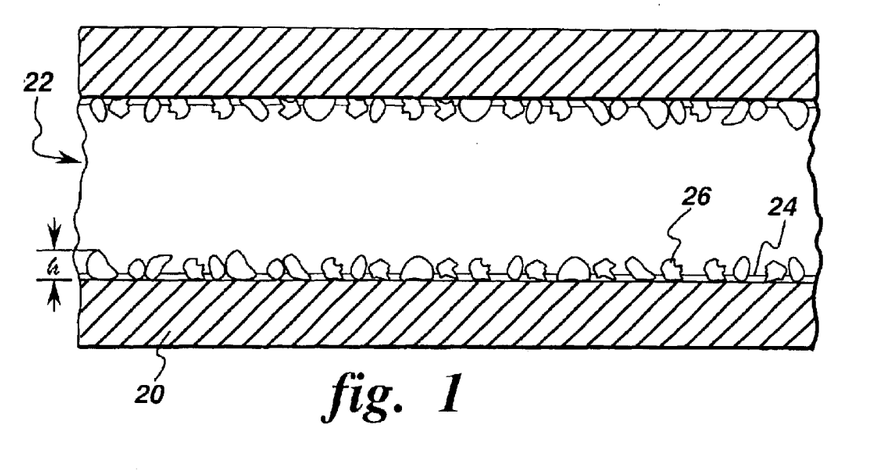
FIG. 1 is an illustration of a partial cross-section of a brazing sheet containing protuberances.

FIG. 1 illustrates an embodiment of the present invention after fusing. As shown, component 20 has an internal cavity 22 through which "backside" coolant fluid is passed. The internal surfaces of the component 22 are treated according any one of the techniques heretofore described, to form a braze alloy film 24 that forms a continuous matrix phase, and a discrete particulate phase 26 comprised of turbulation material. In FIG. 1, the particles of particulate phase are randomly arranged, but may alternatively be arranged according to a predetermined patterned as described above. While the component 20 is shown in partial cross section to have a cylindrical form, it may take on any one of the many shapes and sizes of components of state of the art turbine engines, for example. While turbulation is shown on an internal surface of component 20, it may be provided externally in components where hot gases travel through internal cavities, and cooling fluids pass over the exterior surfaces.

The average height $\underline{h}$ of the protuberances as measured from the substrate is generally on the order of the average particle size of the particles of the turbulation material, such as about 125 microns to about 4000 microns or about 150 microns to about 2050 microns. The height $\underline{h}$ may also be within a range of about 180 to about 600 microns. The thickness of the braze alloy film 24 overlying the substrate is generally chosen, to ensure adequate roughness and ensure an increase in surface area, provided by the particulate phase 26, while also ensuring adequate adhesion of the particles to the substrate. The thickness may be on the order of about 20 microns to 100 microns, more particularly, 30 to 70 microns. In one embodiment, the thickness is approximately 50 microns. It is noted that the braze alloy film 24 mainly forms thin layer shown in FIG. 1, but also may form a thin coating overlying the individual particles of the particulate phase 26.

In another embodiment of the present invention, the protuberances can be formed on the brazing sheet by the use of a mold, rather than by individual, discrete particles of turbulation powder. The mold includes recesses (within one of its major surfaces) suitable for replicating the size and shape of the protuberances. The mold can be a sheet of rubber (for example, an RTV compound) or any synthetic material. Alternatively, the mold can be formed of a ceramic or metallic material. This type of mold can itself be made from an existing turbulation-surface by techniques well-known in the art.

One of the mold techniques for this embodiment may be referred to as "green casting". According to this technique, the recesses of the mold are filled with a slurry material. The slurry contains a liquid medium, the turbulation powder, braze alloy powder, and optionally a binder. The liquid medium may function as a solvent for the binder, effective to enhance the mixing of alloy and binder. The liquid medium may include water, an organic component such as acetone, aromatic solvents such as toluene, isopropanol, or various xylenes, or mixtures of water and the organic component. The braze alloy and turbulation material compositions can be as described previously. Suitable binders have also been described for other embodiments, e.g., water-based organic materials or solvent-based binders.

The recesses can be filled with the slurry by any convenient technique, such as casting or trowelling. Sometimes, a small amount of a release agent, such as a stearate or a silicone-based material, is applied to all or part of the surfaces of the recesses before filling with the slurry, to promote separation from the mold at the appropriate time.

The open face of the filled mold is then usually placed against a surface of the brazing sheet, which can be a green braze tape or braze foil, as described previously. The sheet surface may have an adhesive layer applied thereto, to enhance adhesion between the molded protuberances and the sheet. The mold can then be pulled or cut off the sheet, leaving the exposed protuberances.

Alternatively, the braze tape could be formed "in-situ" on the open face of the mold, which is filled with turbulation powder and braze alloy. In other words, a slurry of tape-forming metal powder, binder, and optionally, solvent, could be applied to the open face of the mold. Evaporation of the volatile material in the slurry results in a tape in the green state. The slurry may be heated to increase the evaporation rate. The mold can then be removed to expose the protuberances, before or after application to the substrate.

As yet another alternative, the braze foil could be formed in-situ on the open face of a mold, such as a metal or ceramic mold. This alternative could be carried out by depositing the turbulation material, in molten form, onto the open face of the mold, by one of the techniques described previously, e.g., a thermal spray technique or casting (here, usually liquid metal casting). After the recesses in the mold have been filled, a thin layer of braze alloy, e.g., up to about 125 microns, can be applied over the mold—again by casting or thermal spray. (Sometimes, the surface of the filled mold can be ground to a level state before deposition of the braze alloy). The protuberances remain affixed to the thin braze alloy sheet after removal of the mold.

With respect to the slurry for filling the recesses in the mold, the braze alloy is present in an amount that is sufficient to promote liquid phase sintering of the turbulation powder within the braze alloy liquid matrix, and not so much so as to cause the protrusion to collapse during sintering within a molten pool of braze alloy. The amount of braze alloy is chosen relative to the turbulation powder, such as about 1 to 40 wt % braze alloy and the balance (about 60 to 99 wt %) turbulation powder. The amount of binder is generally present in an amount to ensure sufficient green strength for handling while minimizing the volume of binder burnout, such as about 1 to 20 wt % of the slurry.

In the above examples of this embodiment, the particle size of the turbulation powder need not be as large as described above in connection with, since the protuberances may be formed by groups of particles. Generally, the particle size is within a range of about 1 micron to about 4000 microns, such as about 10 microns to about 2000 microns, preferably not greater than about 500 microns. In one embodiment, the particle size is within a range of about 25 to about 180 microns.

Regardless of which of these turbulation-mold alternatives is employed, the resulting article is a layer of material in the form of a brazing sheet that includes the desired protuberances situated on a braze material, for attachment to the component. The method of attachment will depend in part on whether the brazing sheet is a braze tape or a braze foil, with suitable techniques, in each instance, being described previously.

Figure 2:
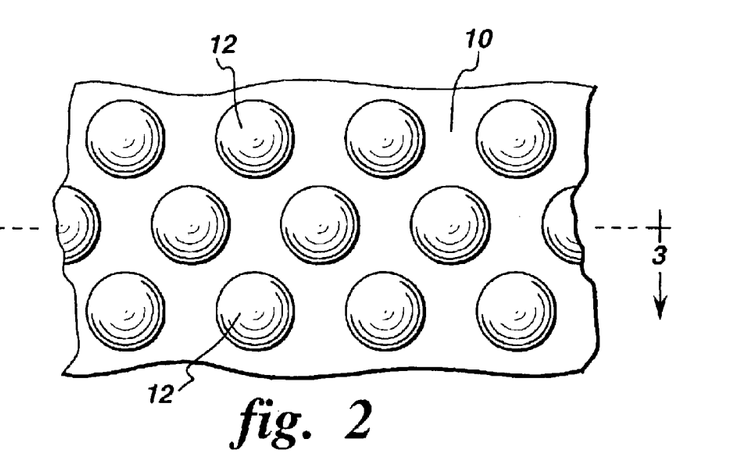
FIG. 2 is an illustration of an elevated perspective view of a brazing sheet containing protuberances.

FIG. 2 is an illustration of an elevated perspective view of a brazing sheet containing protuberances according to this embodiment of the present invention. As illustrated, brazing sheet 10 includes protuberances 12 that are provided to be exposed to a coolant medium. While the protuberances are shown to have a generally semi-spherical shape, they may take on other shapes as well to meet desired roughness and surface area characteristics, to obtain a desired heat transfer enhancement.

Figure 3:
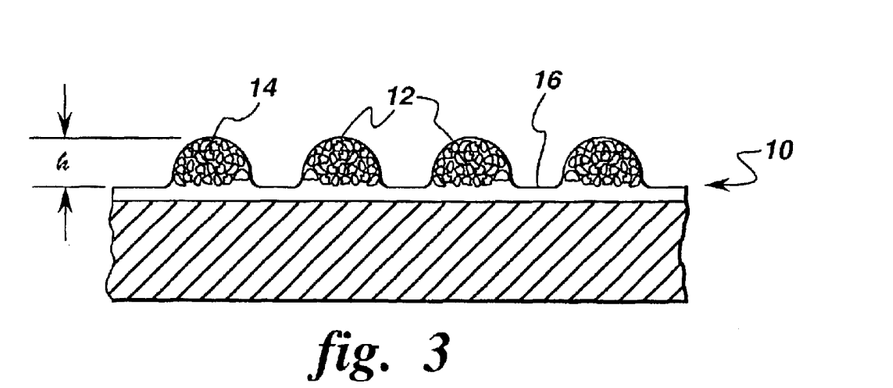
FIG. 3 is an illustration of a cross section of the brazing sheet of FIG. 2, as applied to a substrate.

FIG. 3 illustrates a partial cross-sectional view of the brazing sheet 10 shown in FIG. 2, applied to a substrate 8. As illustrated, protuberances 12 of brazing sheet 10 have a height h on the order of about 125 microns to about 4000 microns, such as about 150 microns to about 2050 microns, similar to the protuberances of the previously described embodiments. The height may also be within a range of about 180 microns to about 600 microns. The protuberances are made up of closely packed grains or particles 14 of the turbulation powder. Braze alloy 16 forms a thin film overlying the substrate, and also fills in spaces between the particles 14 of the turbulation powder within the protuberances. The braze alloy forming an intergranular phase between particles 14 is effective to ensure efficient heat transfer through the protuberances by reducing porosity.

As mentioned above, the size and pattern of turbulation can be readily adjusted to provide maximum heat transfer for a given situation. Usually, the protuberances are substantially semi-spherical in shape, either assuming the shape of the mold recesses or the shape of particles of the turbulation powder, according to the different embodiments discussed herein. Other shapes are possible, such as cones, truncated cones, pins, or fins. The number of protuberances per square cm of substrate will depend upon various factors, such as their size and shape. In one embodiment, the number of protuberances is sufficient to cover about 40% to about 95% of the particular substrate surface, i.e., the particular area of the substrate that is treated according to embodiments of the present invention, which ranges from a small interior cooling channel surface, to the entirety of an exposed surface of a turbine engine component, for example.

The application of turbulation material according to embodiments of the present invention is effective to increase surface area of the substrate. For example, $A/A_0$, where A is the surface area of the treated region of the component and $A_0$ is the surface area of the same region of the component in untreated form (generally a smooth surface), is generally at least about 1.05, typically at least about 1.20. $A/A_0$ is generally less than about 4.0, typically less than about 2.5.

While braze alloy have been described above in connection with the foregoing embodiments as a preferable class of bonding agents, other bonding agents can be used. For example, high temperature epoxies may be used in less demanding environments, such as on non-superalloy components subjected to lower operating temperatures.

In most embodiments, the turbulation (i.e., the "roughness" provided by the protuberances) is present to enhance the heat transfer characteristics for the underlying component. The enhanced heat transfer characteristics in turn result in a desirable temperature reduction for specified regions of the component, leading to a desirable reduction in thermal stress. Moreover, by tailoring the size and spacing of the protuberances, the heat transfer enhancement can also be adjusted, which in turn results in a reduction in the thermal and stress gradients for the component.

Embodiments of the present invention have shown improvement in heat transfer over wire-sprayed turbulation. For example, embodiments of the present invention have provided a heat transfer enhancement greater than 1.52, such as greater than about 1.60, at a jet Reynolds number of 40,000. In contrast, wire-spray techniques have been shown to form turbulation that has a heat transfer enhancement on the order of 1.3 to 1.52 at a jet Reynolds number of 40,000. Particular embodiments of the present invention have shown a heat transfer enhancement of about 1.70 to about 1.82 at a jet Reynolds number of 40,000. The heat transfer enhancements are normalized to 1.0, denoting a smooth, untreated surface. Heat transfer values were measured by embedding thermocouples into the turbulated substrate for temperature measurement. An impingement plate was mounted above the turbulated substrate, and a selected amount of heat was applied to the opposite side of the turbulated. substrate, i.e., the side without the protuberances. Coolant air was then blown through the holes in the impingement plate, onto the turbulated surface. The amount of energy required to keep the turbulated surface at a selected temperature was then measured (the higher the required temperature, the greater the enhancement in heat transfer). The treated samples were then compared to smooth, untreated baseline samples.

According to embodiments of the present invention, by keeping the turbulation close to the surface of the substrate, pressure drop of the coolant medium flow across the cooled surface is reduced and the fin cooling efficiency is improved. For example, in one embodiment, the height of the turbulation is kept below 600 microns, more particularly, less than about 375 microns. The particle size may be less than about 600 microns, more particularly, less than about 375 microns to ensure that the turbulation material is close to the surface to improve fin efficiency.

It is noted that while temperature measurements were taken in connection with impingement cooling (coolant air flow perpendicular to the surface of the substrate), cooling may be effected by convection (coolant air flow parallel to the surface of the substrate) as well in practical use.

Further, embodiments of the present invention demonstrated a marked improvement in oxidation resistance over conventional wire-sprayed turbulation. Samples were thermally cycled between room temperature and a 2,000° F., with a 45 min. hold at 2,000° F. The cycling revealed virtually no oxidation of the turbulated surface at 200 furnace cycles and only slight oxidation at 400 furnace cycles. In contrast, wire-spray turbulation was found to demonstrate significant oxidation at 200 furnace cycles, leading to premature spalling of turbulation.

As described above, turbulation is usually used in conjunction with a coolant medium that is being directed against or across a component used in a high temperature environment. It should be understood that while the coolant medium is usually air, it could also be composed of other fluids such as water.

EXAMPLES

The following examples are merely illustrative, and should not be construed to be any sort of limitation on the scope of the claimed invention. All parts are provided in weight, percent, unless otherwise indicated.

Example 1

A commercial braze tape was used in this example: Amdry® 100 (composition: 10% by weight silicon; 19% by weight chrome, balance nickel). The tape had a thickness of about 25–50 microns, and was coated with a very thin organic adhesive. A coarse NiCrAlY bond coat powder was employed, having an approximate composition as follows: 68 wt. % Ni, 22 wt. % Cr, 9 wt. % Al, and 1 wt. % Y. The powder had an average particle size (diameter) of 50–80 mesh, i.e., 180–300 microns, and was manually applied to the braze tape surface. The tape was then cut to a size of about 5 cm×5 cm, and attached to a portion of a nozzle cavity surface of a turbine engine component formed from a nickel-based superalloy. A solvent (acetone) was then sprayed onto the tape, causing it to plasticize, conform, and adhere securely to the cavity surface.

The nozzle cavity was then vacuum-brazed at a brazing temperature of about 2150° F. (1177° C.), using a vacuum furnace held at about $10^{-5}$ torr. The turbulation powder was completely fused to the cavity surface. The surface exhibited a rough texture because of the presence of the turbulation. The protuberances were substantially semi-spherical in shape. The measured Ra value was about 2.7 mils (68.6 microns), and the Rz value was about 13.5 mils (343 microns). At a jet Reynolds number of 20,000, a 1.7 heat transfer enhancement was measured, and at a jet Reynolds number of 40,000, a 1.9 heat transfer enhancement was measured.

Example 2

The type of NiCrAlY bond coat powder used in Example 1 was used herd. The powder was applied to the braze tape surface (coated with an adhesive) through a 40 mesh screen (425 micron particle size maximum), to form a pattern on the surface. The tape was then cut and attached to a portion of a nozzle cavity surface, as in the previous example. Vacuum-brazing was also carried out as in Example 1, completely fusing the turbulation to the cavity surface, in the desired pattern. The heat transfer measurements for this example, performed as in Example 1, yielded a heat transfer enhancement value of 1.9 at a jet Reynolds number of 40,000.

Example 3

A braze foil having the same alloy as in Example 1, was used in this example. The foil was cut to a size of about 5 cm×5 cm. A patterned layer of adhesive was screen-printed onto the foil surface. The NiCrAlY bond coat powder used in Example 1 was then manually distributed onto the adhesive-coated surface. After the excess powder was removed from the surface, the foil was spot-welded onto a portion of a nozzle cavity surface, and vacuum-brazed thereto, as in Example 1 (same brazing conditions). As in Example 2, the patterned turbulation was completely fused to the cavity surface. At a jet Reynolds number of 20,000, a 1.73 heat transfer enhancement was measured, and at a jet Reynolds number of 40,000, a 1.9 heat transfer enhancement was measured.

While turbulation was applied to in nozzle cavity, a wide variety of-other components may also be treated. For example, other superalloy components including combustor liners, combustor domes, buckets or blades, or shrouds. Non-superalloy components used in lower temperature applications may also be treated. For example, shroud clearance control areas, including flanges, casings, and rings may be advantageously treated. In these embodiments, use of turbulation permits more accurate control of the diameter of the flowpath shroud, thereby decreasing the clearance between the blade tip and shroud surface and increasing efficiency. In view of the lower temperature requirements for the materials of such components, the braze alloy may be replaced with another bonding agent such as a high temperature epoxy or solder, for example. The application of the turbulation material may be by brazing sheet or by slurry containing the bonding agent and the turbulation material, as described above.

As described above, the term "turbulation" has been used to denote a roughened surface comprised of a plurality of protuberances that are effective to increase heat transfer through a treated component. The roughened surface in some embodiments appears sandpaper-like in appearance. The increase in heat transfer is believed to be largely due to the increased surface area of the treated component. Turbulation may also increase heat transfer by modifying the coolant medium flow characteristics, such as from laminar flow to turbulated flow along the surface, particularly where the turbulation material is principally formed of large particle size material.

According to embodiments of the present invention, methods are provided that permit application of turbulation to surfaces that are not easily accessible, to provide improved heat transfer. Further, embodiments of the present invention enable formation of protuberances of varying sizes and shapes, and in a patterns, if desired. In addition, according to embodiments of the present invention that utilize a layer including turbulation material and a bonding agent such as braze alloy, improved resistance to oxidation and corrosion at high temperatures may be achieved, as well as improved heat transfer effectiveness.

Having described preferred embodiments of the present invention, alternative embodiments may become apparent to those skilled in the art without departing from the spirit of this invention. Accordingly, it is understood that the scope of this invention is to be limited only by the appended claims.

What is claimed:

1. An article comprising:
   a brazing sheet including a braze alloy and turbulation material, said turbulation material comprising metal alloy particles having an average particle size within a range of about 125 microns to about 4000 microns, wherein the turbulation material comprises material having the composition MCrAlY, wherein "M" is selected from the group consisting of iron, cobalt, and nickel.

2. The article of claim 1, wherein the brazing sheet comprises a green braze tape.

3. The article of claim 1, wherein the brazing sheet comprises a metal foil.

4. The article of claim 1, wherein the average particle size is within a range of about 150 microns to about 2050 microns.

5. The article of claim 1, wherein the average particle size is within a range of about 180 to about 600 microns.

6. The article of claim 1, wherein "M" is nickel.

7. The article of claim 1, wherein the braze alloy comprises at least one metal from the group consisting of nickel, cobalt, iron, a precious metal, and a mixture thereof.

8. The article of claim 7, wherein the braze alloy comprises at least about 40 wt. % nickel.

9. The article of claim 7, wherein the braze alloy comprises a component for lowering the melting point of the braze alloy.

10. The article of claim 9, wherein the component is selected from the group consisting of silicon, boron, phosphorous, and combinations thereof.

* * * * *